US011388047B1

(12) United States Patent
Hardwick et al.

(10) Patent No.: US 11,388,047 B1
(45) Date of Patent: Jul. 12, 2022

(54) STATELESS CONTROL PLANES

(71) Applicant: MICROSOFT TECHNOLOGY LICENSING, LLC, Redmond, WA (US)

(72) Inventors: Jonathan Eric Hardwick, Chesterfield (GB); Matthew Ian Ronald Williams, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/204,840

(22) Filed: Mar. 17, 2021

(51) Int. Cl.
*G06F 15/173* (2006.01)
*H04L 41/0803* (2022.01)

(52) U.S. Cl.
CPC .............................. *H04L 41/0803* (2013.01)

(58) Field of Classification Search
CPC .................................................. H04L 41/0803
USPC ......................................................... 709/223
See application file for complete search history.

(56) References Cited

U.S. PATENT DOCUMENTS

| | | | |
|---|---|---|---|
| 6,389,464 B1 * | 5/2002 | Krishnamurthy ... | H04L 41/0253 709/221 |
| 7,710,900 B2 * | 5/2010 | Andrews ................. | H04L 45/00 370/254 |
| 7,995,498 B2 * | 8/2011 | Andrews ............. | H04L 41/0886 370/254 |
| 10,103,902 B1 * | 10/2018 | Sampath ............. | H04L 65/1073 |
| 10,530,697 B2 * | 1/2020 | Fourie ................. | H04L 47/2425 |
| 10,673,736 B2 * | 6/2020 | Srinivasan ............. | H04L 45/04 |
| 10,691,337 B2 * | 6/2020 | Pasupathy ............... | G06F 3/061 |
| 10,897,395 B2 * | 1/2021 | A ........................ | H04L 41/0813 |
| 10,924,392 B2 * | 2/2021 | Shenoy .................. | H04L 45/02 |
| 10,985,997 B2 * | 4/2021 | Duggal ............... | H04L 41/5019 |
| 10,992,543 B1 * | 4/2021 | Rachamadugu .... | H04L 41/0869 |
| 10,996,938 B2 * | 5/2021 | Tulsian ............... | H04L 41/0806 |
| 11,025,489 B2 * | 6/2021 | Leijon ................. | H04L 41/0883 |
| 11,088,919 B1 * | 8/2021 | Chandrashekhar ......................... H04L 63/0209 | |
| 11,113,120 B1 * | 9/2021 | Greenfield ............ | G06F 9/4881 |

\* cited by examiner

*Primary Examiner* — Alicia Baturay
(74) *Attorney, Agent, or Firm* — Newport IP, LLC; Han Gim (57) ABSTRACT

The techniques disclosed herein improve existing systems by receiving, by a packet processor from a control node of the communications network, a request to program operations for processing data packets, the request received with opaque data comprising a state of the control node. The packet processor stores the operations and the opaque data in a data store of the packet processor. The packet processor receives from the control node a subsequent request to retrieve the opaque data. The packet processor sends to the control node the operations and the opaque data that were stored in the data store of the packet processor. The opaque data is not stored in the control node.

20 Claims, 6 Drawing Sheets

STATELESS CONTROL PLANES

BACKGROUND

In some data networks such as in a 5G network, the control plane may be implemented with a stateless design which allows control plane components to restart and to scale up and down in number without needing to undertake expensive and error-prone operations to recover and/or redistribute state. The control plane components may store their application state in some external state store dedicated for the purpose of storing state, such as a database. When a control plane component processes a user-related event, it may first retrieve the necessary state for that user from its state store, process the event, write back the updated state to the state store if necessary, and free the state from its own memory.

The user-plane components typically operate in a different manner. The user-plane typically keeps a local copy of the state for each user plane session that it owns since it would be too slow to retrieve this from a state store every time it wanted to forward a user plane packet. Therefore, the user plane component is typically stateful.

It is with respect to these considerations and others that the disclosure made herein is presented.

SUMMARY

One challenge when the control plane is stateless and the user plane is stateful is how to ensure that the control plane state stored in the external data store remains consistent with the user plane state. The control plane state and user plane state could become unsynchronized due to network instability or a component failure, where the control plane component could retrieve either control or user plane state from a node with an older version of the state (i.e., a node to which the latest version of the state had not been replicated).

Some techniques for addressing this problem involve versioning and then reconciling the copies of state stored in the external database and in the user plane. For example, the control plane component may retrieve the control plane state to find that it is version A, and retrieve the user plane state to find that it is version B. If A is not equal to B, then (1) the user plane is either wiped and recreated, or (2) the control plane must calculate and apply a delta to its state to bring it up to version B, before then making whatever change is being requested by the user event to bring both copies of the state up to version C. This involves additional processing and latency, as well as significantly increasing the complexity of the code required in the control plane.

The present disclosure provides a way to guarantee that the control plane components will retrieve matching control and user plane state (i.e., at the same version) without the need for version numbers or a reconciliation process, by locating the control plane's external state store in the user plane. Various embodiments are disclosed herein for encoding the control plane state in a user plane graph object and then storing that state within the packet processing graph, such that the state can be retrieved by the control plane at the same time as the relevant parts of the packet processing graph that are to be modified.

Some embodiments include the concept of a subgraph, where a subgraph may be a set of graph objects in the user plane that are programmed by the control plane and which relate to some application-defined entity that can be managed by a control plane flow. For example, in a 5G network, a subgraph may represent the collection of graph objects for a PDU session. The application in the control plane may create a subgraph for each such entity and add the relevant graph objects for the entity to the subgraph. The application encodes the ID of the subgraph in whatever control-plane identifier is used for the entity. When an application wishes to retrieve the user plane state for an entity that it wants to modify, it retrieves the subgraph ID from the entity ID, queries for the appropriate subgraph, and the user plane returns the relevant objects in full. The application can then modify these objects as necessary.

Some embodiments include the concept of an OpaqueData graph object. This graph object may be stored in the subgraph alongside all the other user plane graph objects, but the OpaqueData graph object does not play a part in processing packets. Instead, the OpaqueData graph object stores the application's control plane state within the subgraph, so that this can be read back by the application at the same time as the other objects in the subgraph.

Instances of the user plane component may replicate each subgraph to other instances as an atomic unit, so that all objects (or all modified objects) are packed into a single replication message which either succeeds or fails atomically. This ensures that each user plane instance holds a copy of the subgraph whose OpaqueData object is at a version consistent with the other user-plane objects.

The described techniques can allow for maintaining efficient use of computing and network resources such as processor cycles, memory, network bandwidth, and power. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

In some networks, the control plane may have a stateless design which allows control plane components to restart and to scale up and down in number without needing to undertake expensive and error-prone operations to recover and/or redistribute state. The control plane components store their application state in some external state store dedicated to the purpose of storing state, such as a database. When a control plane component processes a user-related event, it may retrieve the necessary state for that user from its state store, process the event, write back updated state to the state store if necessary, and free the state from its own memory.

However, the user plane components cannot typically afford the latencies involved in remotely storing states. It must therefore keep a local copy of the state for each user plane session that it owns. However, this illustrates a problem that is typical of situations where one service that is stateless is programming another service that is stateful, which is how to ensure that the programming entity has a consistent view of what has been programmed with what has been successfully stored. It is possible, for instance, that the stateless service has programmed rules in the stateful service for a given task, requests that the database store a copy of the state, and when the state is read back from the database, the returned state conflicts with the actual state. For example, the database may not have updated the state, or there is some other failure such as network instability such that the database has not updated the state.

Systems and methods are disclosed herein for providing a way to ensure that control plane components will retrieve matching control and user plane state (i.e., at the same version) without the need for version numbers or a reconciliation process, by locating the control plane's external state store in the user plane. Various embodiments are disclosed herein for encoding the control plane state in a user plane graph object and then storing that state within the packet processing graph, such that the state can be retrieved by the control plane at the same time as the relevant parts of the packet processing graph that are to be modified.

Some embodiments include the concept of a subgraph, where a subgraph may be a set of graph objects in the user plane that are programmed by the control plane and which relate to some application-defined entity that can be managed by a control plane flow. For example, in a 5G network, a subgraph may represent the collection of graph objects for a PDU session. The application creates a subgraph for each such entity and adds the relevant graph objects for the entity to the subgraph. The application encodes the ID of the subgraph in whatever control-plane identifier is used for the entity. When an application wishes to retrieve the user plane state for an entity that it wants to modify, it retrieves the subgraph ID from the entity ID, queries for the appropriate subgraph, and the user plane returns the relevant objects in full. The application can then modify these objects as necessary.

Some embodiments include the concept of an OpaqueData graph object. This graph object may be stored in the subgraph alongside all the other user plane graph objects, but the OpaqueData graph object does not play a part in processing packets. Instead, the OpaqueData graph object stores the application's control plane state within the subgraph, so that this can be read back by the application at the same time as the other objects in the subgraph.

In some embodiments, the OpaqueData object may contain:

An opaque byte array of application data suitably serialized by the application in a format determined by the application.

A version number which allows the application in the control plane component to distinguish between different formats in which the application data may be serialized (for example, if the application is hot-upgraded and the format changes, while subgraphs still exist which contain opaque data that was written in the previous format).

Instances of the user plane component may replicate each subgraph to other instances as an atomic unit, so that all objects (or all modified objects) are packed into a single replication message which either succeeds or fails atomically. This ensures that each user plane instance holds a copy of the subgraph whose OpaqueData object is at a version consistent with the other user-plane objects.

By implementing the described embodiments, networks can avoid more costly methods for attempting to ensure consistency of control and user plane states. For example, a network can store a copy of the user plane state in the control plane state's database and treat this as the master copy. However, this would still allow the possibility of the master copy of the user plane state and the actual user plane pipeline to get out of sync.

The described embodiments allow for simplification of the application's code and can potentially reduce the number of asynchronous operations that the application must complete to process a user event, therefore reducing latency. The described embodiments may also eliminate an unnecessary dependency on a third-party database component. Additionally, the described embodiments may allow for techniques that are more performant than a general-purpose database lookup both because of the reduced processing in the application and because the method is specialized to the purpose of storing and retrieving atoms of control plane state.

Figure 1:
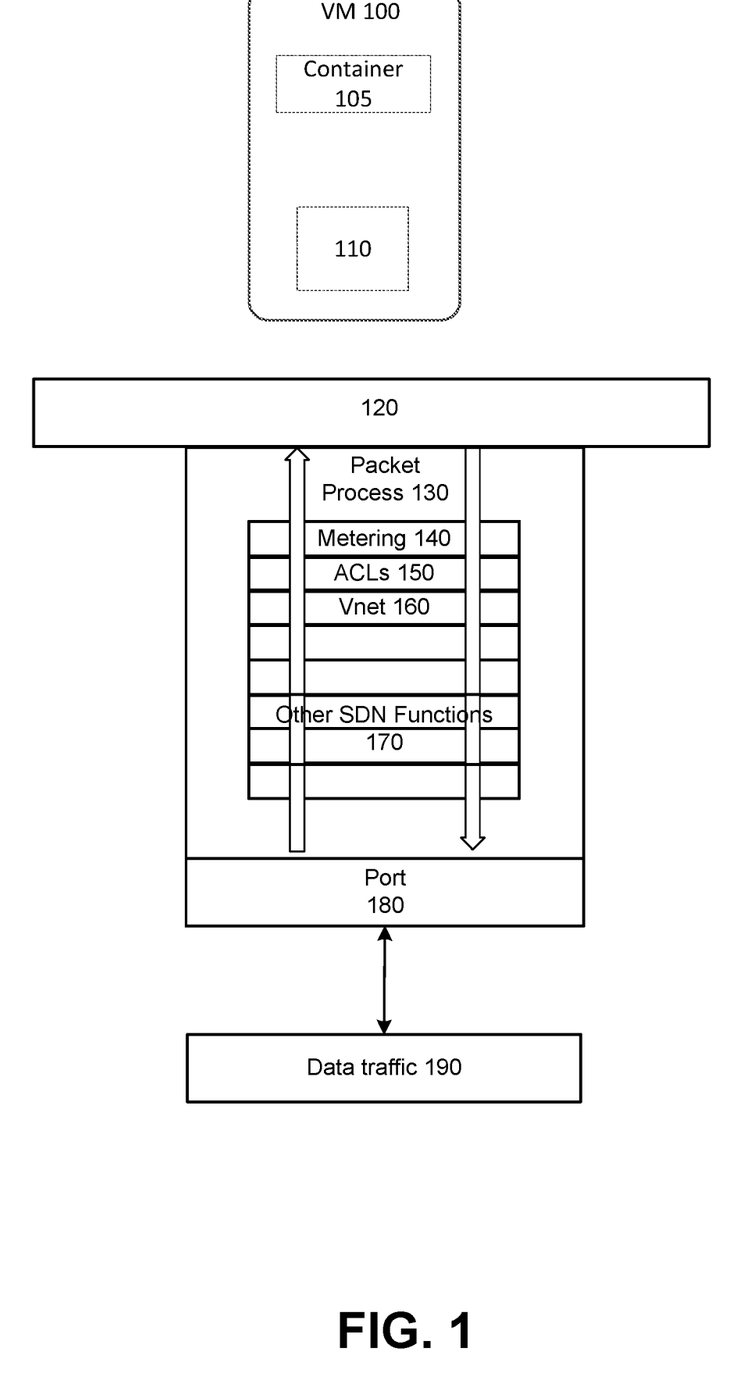
FIG. 1 is a diagram illustrating an example architecture in accordance with the present disclosure.

FIG. 1 illustrates an example computing environment in which the embodiments described herein may be implemented. FIG. 1 shows an example packet processing extension 130 for a network service 120 that applies various operations on packets, such as specific networking policies that are tied to container 105. The network service 120 may logically underly the NIC 110 and may provide a port 180 for each VM supported by the NIC 110. The packet processing extension 130 may apply policies and transform or tunnel data packets in a given computing workload that are entering and leaving the VM 100. The packet processing extension 130 may include a central data packet processor (not shown) that performs the processing of data packets. The packet processing layers may include, in this example, those relating to metering 140, access control lists (ACLs) 150, VNet addressing/routing 160, and other various SDN functions or features 170 which may include, for example, those pertaining to routing, tunneling, filtering, address translation, encryption, decryption, encapsulation, de-encapsulation, quality of service (QoS), and the like. The packet processor in the packet processing extension 130 may evaluate the packets of data traffic 190 as they traverse the networking policy layers, matching rules in each layer based on a state of the packet after an action is performed in the preceding layer. Returning packets may traverse the layers in the opposite direction and may be processed by the packet processing extension 130 to match the applicable rules. The rules used to express the networking policies may be entities that perform actions on matching packets (e. g., using a match action table model) as the computing workload is processed by the packet processing extension 130.

Packet processing rules are typically expressed in tables where the device examines specific bits within the packet and compares the values of those bits with the keys stored in the various rows in the table. The table rows may also contain actions to perform on packets that match against them and may indicate a subsequent table of rules to check. Different packets in general may visit a different sequence of tables. The collection of tables and the links between them may be referred to as the packet processing graph.

Figure 2:
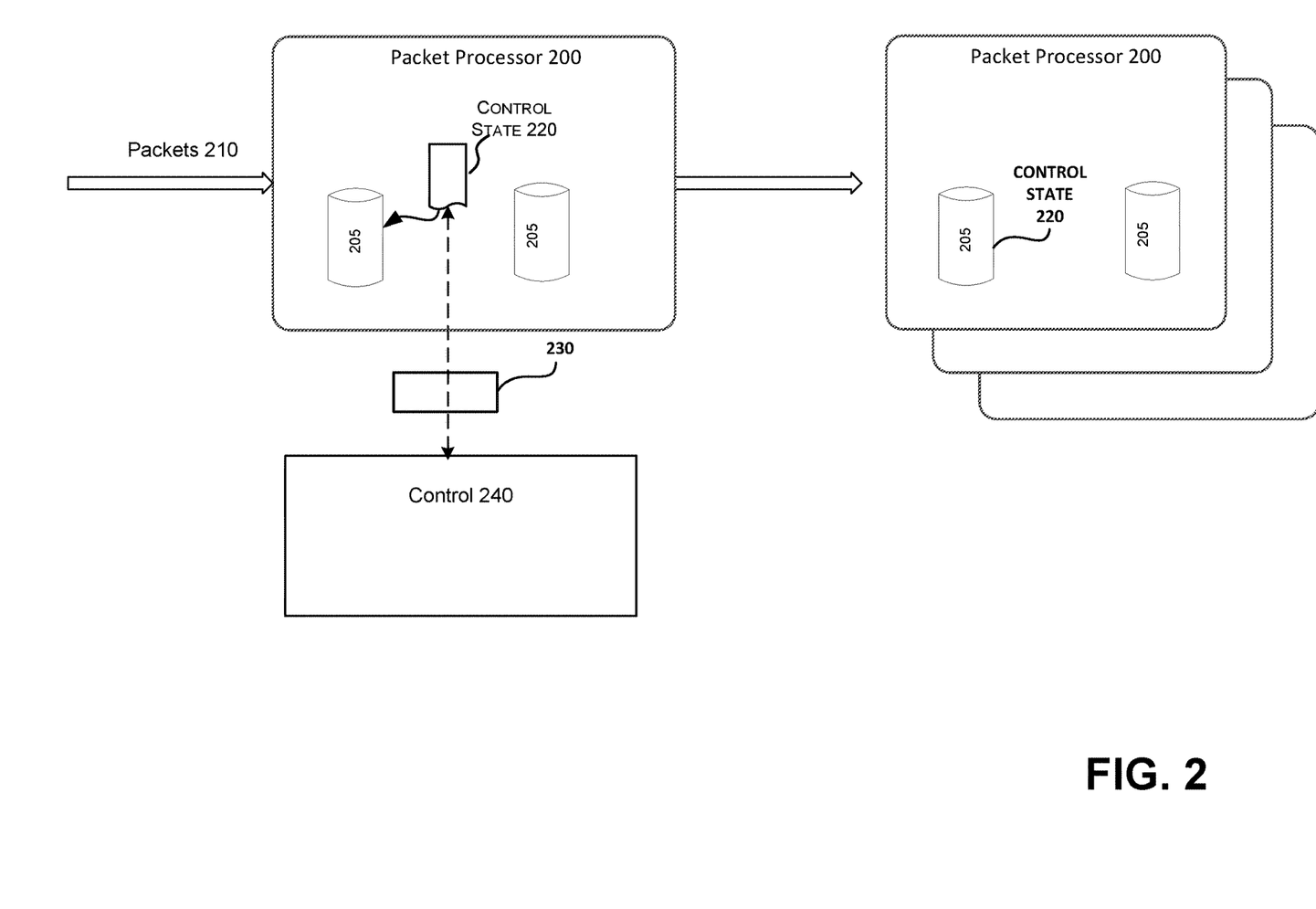
FIG. 2 is a diagram illustrating an example architecture in accordance with the present disclosure.

FIG. 2 illustrates an example environment in which the embodiments described herein may be implemented. FIG. 2 shows one or more packet processors 200 which has a data store 205 storing thereon control states 220. The packet processors 200 may operate in the user plane and interact with control node or component 240 that operates in the control plane. The control node or component 240 does not store its state in an internal data store, but pushes its state to the state store 205 in packet processor 200.

The control state 220 stored in the data store 205 may include one or more packet processing graphs each of which instructs the packet processor 200 how to process a flow in the user plane. Each flow may be represented as a subgraph that is created by the control node or component 240, which adds a node to the subgraph that has control plane data. The control node or component 240 may serialize the data into a data blob 230 and add the data blob 230 to the subgraph in the packet processor 200 for the appropriate subflow. The data blob may be an object of type OpaqueData which the packet processor 200 is programmed to recognize.

The operation of the control node or component 240 and one or more packet processors 200 may be triggered by an event, for example, that invokes a data flow. When changes are made to a packet processing graph, the control node or component 240 may determine a delta to the subgraph, update the subgraph, and send new state data for storing in the data store 205. The new state data may be written over the previously stored state data.

The stored states may remain consistent when retrieved by the control node or component 240 even in the event that the latest state data are not replicated across all of the packet processors. Thus, if a second packet processor 200 did not receive the state information provided to the first packet processor 200 and update its data store, the second packet processor 200 will send its last stored state data along with the other objects in the subgraph. Since the packet processor updates its stored state data atomically, the control node or component 240 will always receive internally consistent state data.

In some embodiments, packet processors can be associated with shards, which can be used to identify which packet processor that the control component should query. For example, a subgraph can have a key to identify an associated shard.

Figure 3:
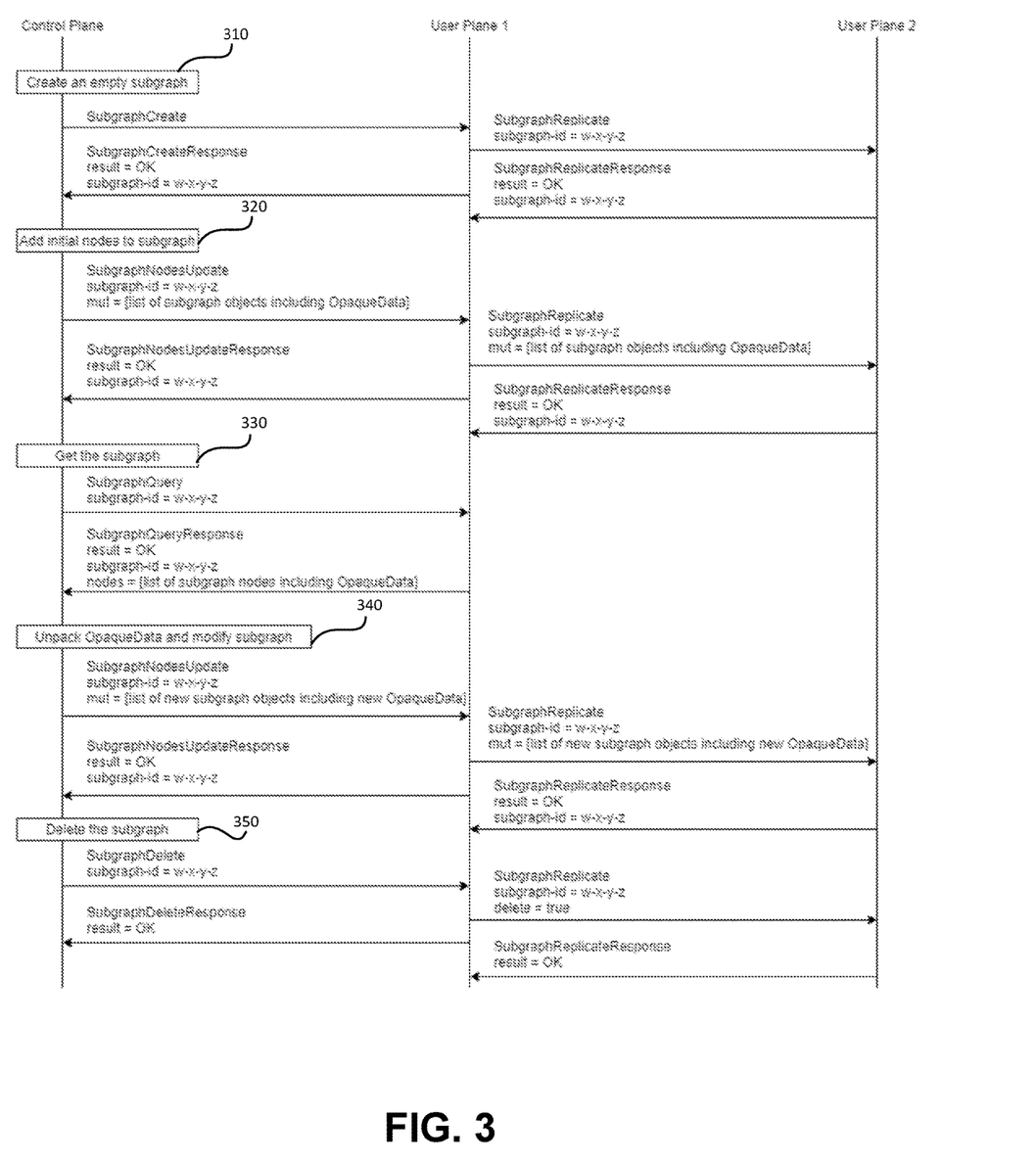
FIG. 3 is a diagram illustrating a flow diagram in accordance with the present disclosure.

An example flow is illustrated in FIG. 3, which illustrates:

Control plane creating a subgraph (SubgraphCreate message) 310. Between user planes, the subgraph may be replicated. For example, FIG. 3 illustrates User Plane 1 and User Plane 2. A SubgraphReplicate message may be sent from User Plane 1 to User Plane 2. A SubgraphReplicatResponse message may be sent in response.

Control plane adding an initial set of nodes to the subgraph, including OpaqueData (first SubgraphNodesUpdate message) 320. A SubgraphReplicate message may be sent from User Plane 1 to User Plane 2. A SubgraphReplicatResponse message may be sent in response.

Control plane querying the subgraph (SubgraphQuery message) 330. SubgraphQueryResponse message may be received in response.

Control plane unpacking the OpaqueData then modifying the subgraph, including the OpaqueData (second SubgraphNodesUpdate message) 340. A SubgraphReplicate message may be sent from User Plane 1 to User Plane 2. A SubgraphReplicatResponse message may be sent in response.

Control plane deleting the subgraph (SubgraphDelete message) 350. a SubgraphDeleteResponse message may be received in response. A SubgraphReplicate message may be sent from User Plane 1 to User Plane 2. A SubgraphReplicatResponse message may be sent in response.

At each stage, the subgraph may be replicated to the backup instance of the user plane in a single SubgraphReplicate message.

Figure 4:
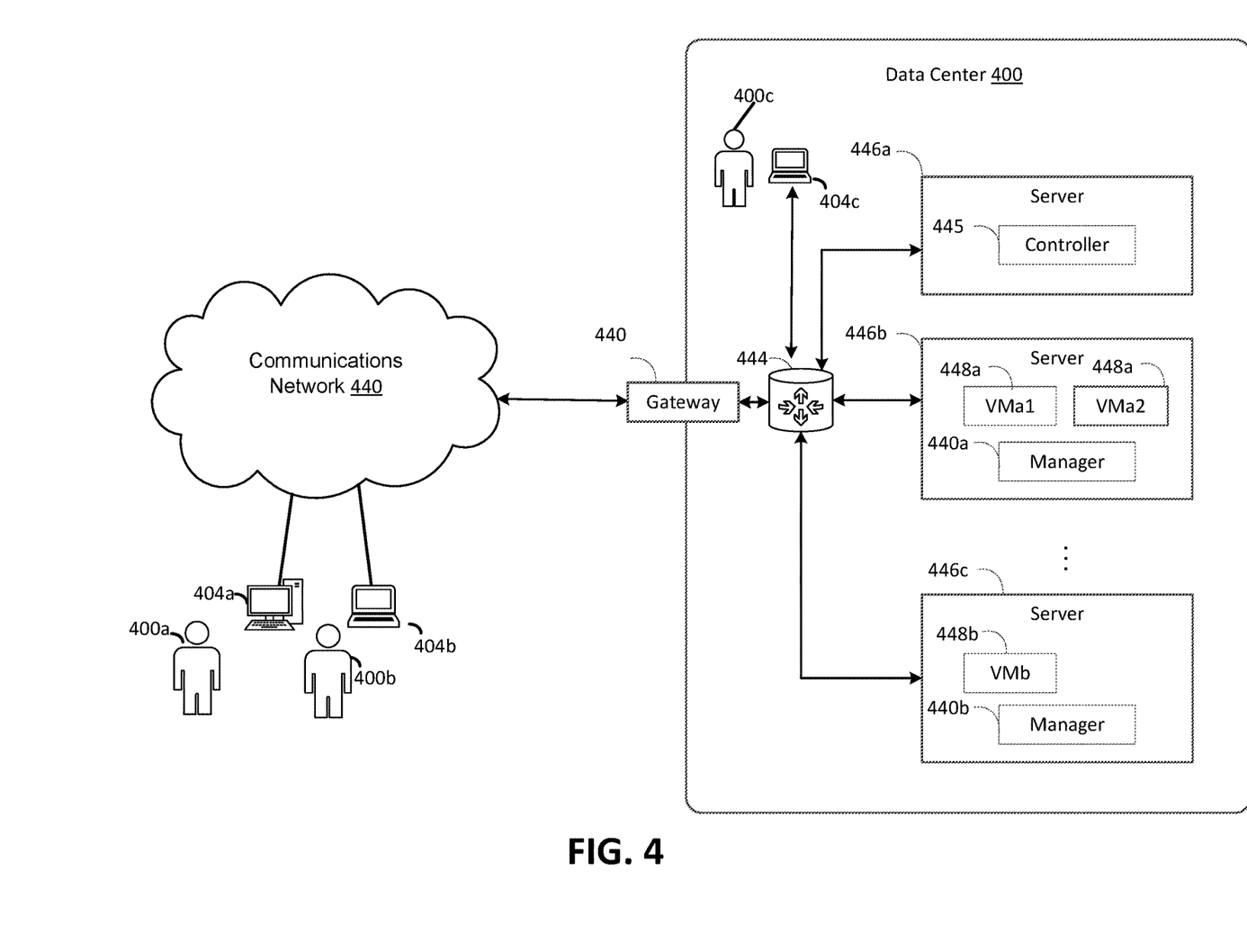
FIG. 4 is a flowchart depicting an example computing environment in accordance with the present disclosure.

FIG. 4 illustrates an example computing environment in which the embodiments described herein may be implemented. FIG. 4 illustrates a data center 400 that is configured to provide computing resources to users 400a, 400b, or 400c (which may be referred herein singularly as "a user 400" or in the plural as "the users 400") via user computers 404a, 404b, and 404c (which may be referred herein singularly as "a computer 404" or in the plural as "the computers 404") via a communications network 440. The computing resources provided by the data center 400 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 400 may correspond to data center 100 and 110 of FIG. 2. Data center 400 may include servers 446a, 446b, and 446c (which may be referred to herein singularly as "a server 446" or in the plural as "the servers 446") that may be standalone or installed in server racks, and provide computing resources available as virtual machines 448a and 448b (which may be referred to herein singularly as "a virtual machine 448" or in the plural as "the virtual machines 448"). The virtual machines 448 may be configured to execute applications such as Web servers, application servers, media servers, database servers, and the like. Other resources that may be provided include data storage resources (not shown on FIG. 4) and may include file storage devices, block storage devices, and the like. Servers 446 may also execute functions that manage and control allocation of resources in the data center, such as a controller 445. Controller 445 may be a fabric controller or another type of program configured to manage the allocation of virtual machines on servers 446.

Referring to FIG. 4, communications network 440 may, for example, be a publicly accessible network of linked networks and may be operated by various entities, such as the Internet. In other embodiments, communications network 440 may be a private network, such as a corporate network that is wholly or partially inaccessible to the public.

Communications network 440 may provide access to computers 404. Computers 404 may be computers utilized by users 400. Computer 404*a*, 404*b* or 404*c* may be a server, a desktop or laptop personal computer, a tablet computer, a smartphone, a set-top box, or any other computing device capable of accessing data center 400. User computer 404*a* or 404*b* may connect directly to the Internet (e.g., via a cable modem). User computer 404*c* may be internal to the data center 400 and may connect directly to the resources in the data center 400 via internal networks. Although only three user computers 404*a*,404*b*, and 404*c* are depicted, it should be appreciated that there may be multiple user computers.

Computers 404 may also be utilized to configure aspects of the computing resources provided by data center 400. For example, data center 400 may provide a Web interface through which aspects of its operation may be configured through the use of a Web browser application program executing on user computer 404. Alternatively, a stand-alone application program executing on user computer 404 may be used to access an application programming interface (API) exposed by data center 400 for performing the configuration operations.

Servers 446 may be configured to provide the computing resources described above. One or more of the servers 446 may be configured to execute a manager 440*a* or 440*b* (which may be referred herein singularly as "a manager 440" or in the plural as "the managers 440") configured to execute the virtual machines. The managers 440 may be a virtual machine monitor (VMM), fabric controller, or another type of program configured to enable the execution of virtual machines 448 on servers 446, for example.

It should be appreciated that although the embodiments disclosed above are discussed in the context of virtual machines, other types of implementations can be utilized with the concepts and technologies disclosed herein.

In the example data center 400 shown in FIG. 4, a network device 444 may be utilized to interconnect the servers 446*a* and 446*b*. Network device 444 may comprise one or more switches, routers, or other network devices. Network device 444 may also be connected to gateway 440, which is connected to communications network 440. Network device 444 may facilitate communications within networks in data center 400, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 4 has been greatly simplified and that many more networks and networking devices may be utilized to interconnect the various computing systems disclosed herein. These network topologies and devices should be apparent to those skilled in the art.

It should also be appreciated that data center 400 described in FIG. 4 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 5:
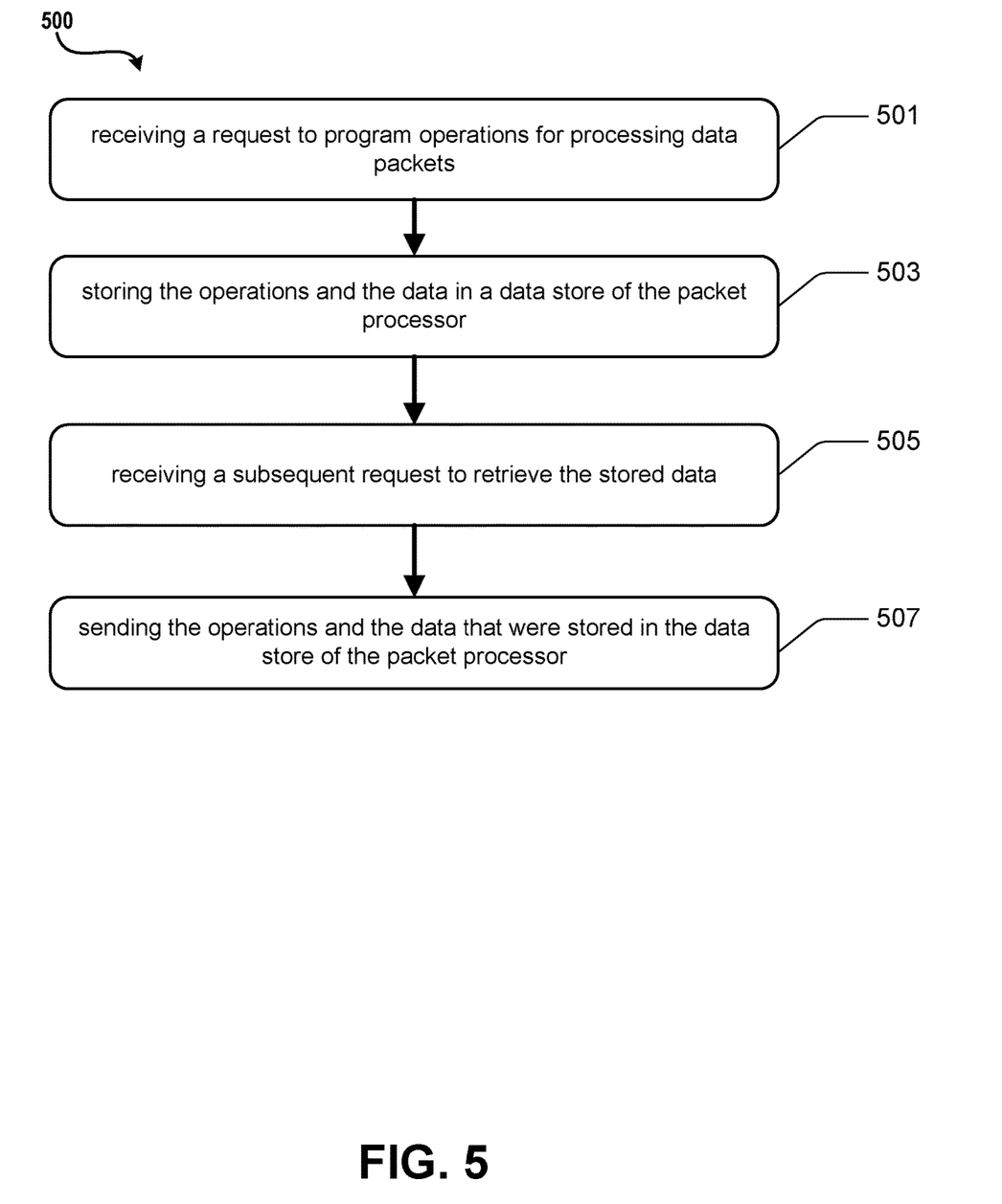
FIG. 5 is a flowchart depicting an example procedure in accordance with the present disclosure.

Turning now to FIG. 5, illustrated is an example operational procedure for managing states in a communications network in accordance with the present disclosure. The communications network may comprise a user plane for communicating data packets between endpoints, and a control plane for managing connections between the endpoints. The communications network may comprise a packet processor configured to operate in the user plane and apply packet processing operations to the data packets, and a control node configured to operate in the control plane and manage communication of the data packets in the communications network.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 500 is described as running on a system, it can be appreciated that the routine 500 and other operations described herein can be executed on an individual computing device, e.g., computing device 600, or several devices.

Additionally, the operations illustrated in FIG. 5 and the other FIGURES can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

Referring to FIG. 5, operation 501 illustrates receiving, by the packet processor from the control node, a request to program data plane operations for processing data packets being communicated between two of the endpoints. In an embodiment, the request is sent with data comprising a control plane state associated with the control node and the processing of the data packets. Operation 501 may be followed by operation 503. Operation 503 illustrates storing, by the packet processor, the operations and the data in a data store of the packet processor, wherein the operations and the data are stored atomically. Operation 503 may be followed by operation 505. Operation 505 illustrates receiving, by the packet processor from the control node, a subsequent request to retrieve the stored data. Operation 505 may be followed by operation 507. Operation 507 illustrates sending, by the packet processor to the control node, the operations and the data that were stored in the data store of the packet processor. In an embodiment, the state is stored outside of the control node. In an embodiment, the state is not stored at the control node. The operations need not be executed separately and may be combined.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc. A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 6:
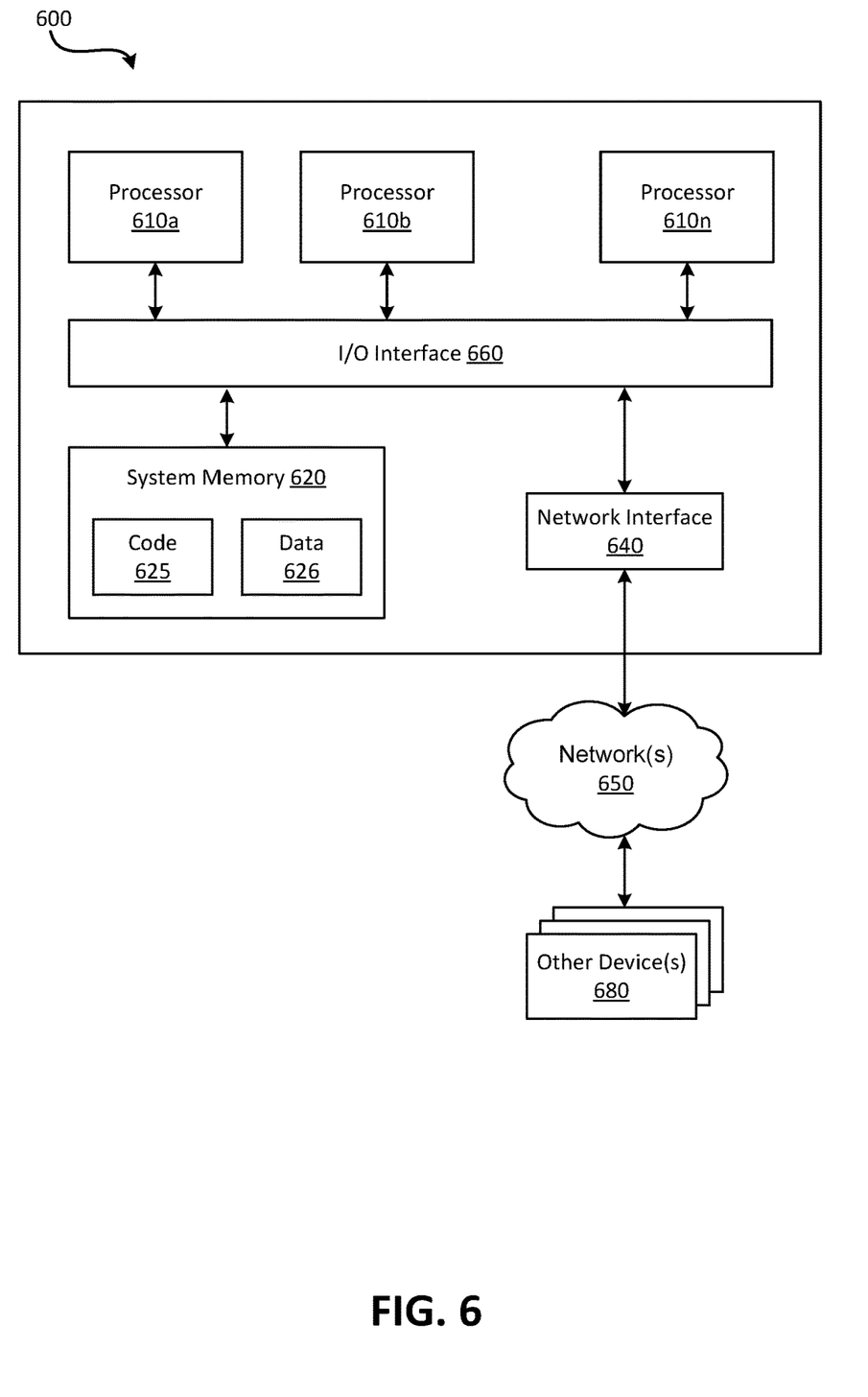
FIG. 6 is an example computing device in accordance with the present disclosure.

FIG. 6 illustrates a general-purpose computing device 600. In the illustrated embodiment, computing device 600 includes one or more processors 610a, 610b, and/or 610n (which may be referred herein singularly as "a processor 610" or in the plural as "the processors 610") coupled to a system memory 66 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 66 may be configured to store instructions and data accessible by processor(s) 610. In various embodiments, system memory 66 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between the processor 610, system memory 66, and any peripheral devices in the device, including network interface 640 or other peripheral interfaces. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or network(s) 660, such as other computer systems or devices as illustrated in FIGS. 1 through 5, for example. In various embodiments, network interface 640 may support communication via any suitable wired or wireless general data networks, such as types of Ethernet networks, for example. Additionally, network interface 640 may support communication via telecommunications/telephony networks such as analog voice networks or digital fiber communications networks, via storage area networks such as Fibre Channel SANs or via any other suitable type of network and/or protocol.

In some embodiments, system memory 620 may be one embodiment of a computer-accessible medium configured to store program instructions and data as described above for FIGS. 1-5 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 620 or another type of memory. Further, a computer-accessible medium may include transmission media or signals such as electrical, electromagnetic or digital signals, conveyed via a communication medium such as a network and/or a wireless link, such as may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 6, or may utilize an architecture completely different than that shown in FIG. 6.

The disclosure presented herein also encompasses the subject matter set forth in the following clauses:

Clause 1: A machine-implemented method for managing states in a communications network comprising a user plane for communicating data packets between endpoints, and a control plane for managing connections between the endpoints, the communications network comprising a packet processor configured to operate in the user plane and apply packet processing operations to the data packets, and a control node configured to operate in the control plane and manage communication of the data packets in the communications network, the method comprising:

receiving, by the packet processor from the control node, a request to program data plane operations for processing data packets being communicated between two of the endpoints, the request sent with data comprising a control plane state associated with the control node and the processing of the data packets;

storing, by the packet processor, the operations and the data in a data store of the packet processor, wherein the operations and the data are stored atomically;

receiving, by the packet processor from the control node, a subsequent request to retrieve the stored data; and sending, by the packet processor to the control node, the operations and the data that were stored in the data store of the packet processor;

wherein the state is stored outside of the control node.

Clause 2: The method of clause 1, wherein the program operations are represented as a packet processing subgraph.

Clause 3: The method of any of clauses 1-2, wherein the data comprises a graph object of the packet processing subgraph.

Clause 4: The method of any of clauses 1-3, wherein the data includes a byte array of application data.

Clause 5: The method of any of clauses 1-4, wherein the data further includes a version identifier that indicates a format of the byte array of application data.

Clause 6: The method of any of clauses 1-5, further comprising:

sending, to a second packet processor, the operations and the data, subsequent to storing the operations and the data.

Clause 7: The method of clauses 1-6, wherein the data is requested in response to a user event in the communications network.

Clause 8: The method of any of clauses 1-7, wherein the data is requested in response to a failure in the communications network.

Clause 9: The method of any of clauses 1-8, further comprising:

subsequent to storing the operations and the data, replicating the operations and the data by sending the operations and the data to one or more other packet processors.

Clause 10: The method of any of clauses 1-9, wherein the operations and the data are sent as an atomic unit which either succeeds or fails atomically.

Clause 11: A system, comprising:

one or more data processing units; and a computer-readable medium having encoded thereon computer-executable instructions to cause the one or more data processing units to perform operations comprising:

receiving, from a control node of a communications network, a request to program operations for processing data packets being communicated between two endpoints of the communications network, the request received with data comprising a state of the control node and the processed data packets, the control node configured to operate in a control plane of the communications network and manage communication of the data packets in the communications network;

storing the operations and the data in the data store;

receiving, from the control node, a subsequent request to retrieve the data; and sending, to the control node, the operations and the data that were stored in the data.

Clause 12: The system of clause 11, wherein the program operations are represented as a packet processing subgraph.

Clause 13: The system of any of clauses 11 and 12, wherein the data comprises a graph object of the packet processing subgraph.

Clause 14: The system of any clauses 11-13, wherein the data includes a byte array of application data.

Clause 15: The system of any clauses 11-14, wherein the data further includes a version identifier that indicates a format of the byte array of application data.

Clause 16: A computer-readable medium having encoded thereon computer-executable instructions that, when executed, cause one or more processing units of a computing device to execute operations comprising:

sending, to a packet processor of a communications network, a request to program operations for processing data packets, the request including data comprising a control plane state, wherein the packet processor is configured to store the operations and the data in a data store of the packet processor;

sending, to the packet processor, a subsequent request to retrieve the data; and receiving, from the packet processor, the operations and the data that were stored in the data store of the packet processor;

wherein the control plane state is not stored locally.

Clause 17: The system of clause 16, wherein the data is requested in response to a user event in the communications network.

Clause 18: The system of any of clauses 16 and 17, wherein the data is requested in response to a failure in the communications network.

Clause 19: The system of any of the clauses 16-18, wherein the program operations are represented as a packet processing subgraph.

Clause 20: The system of any of the clauses 16-19, wherein the data comprises a graph object of the packet processing subgraph.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A machine-implemented method for managing states in a communications network comprising a user plane for communicating data packets between endpoints, and a control plane for managing connections between the endpoints, the communications network comprising a packet processor configured to operate in the user plane and apply packet processing operations to the data packets, and a control node configured to operate in the control plane and manage communication of the data packets in the communications network, the method comprising:

receiving, by the packet processor from the control node, a request to program data plane operations for processing data packets being communicated between two of the endpoints, the request sent with data comprising a control plane state associated with the control node and the processing of the data packets;

storing, by the packet processor, the operations and the data in a data store of the packet processor, wherein the operations and the data are stored atomically;

receiving, by the packet processor from the control node, a subsequent request to retrieve the stored data; and sending, by the packet processor to the control node, the operations and the data that were stored in the data store of the packet processor;

wherein the state is stored outside of the control node.

2. The method of claim 1, wherein the operations are represented as a packet processing subgraph.

3. The method of claim 2, wherein the data comprises a graph object of the packet processing subgraph.

4. The method of claim 1, wherein the data includes a byte array of application data.

5. The method of claim 4, wherein the data further includes a version identifier that indicates a format of the byte array of application data.

6. The method of claim 1, further comprising:

sending, to a second packet processor, the operations and the data, subsequent to storing the operations and the data.

7. The method of claim 1, wherein the data is requested in response to a user event in the communications network.

8. The method of claim 1, wherein the data is requested in response to a failure in the communications network.

9. The method of claim 1, further comprising:

subsequent to storing the operations and the data, replicating the operations and the data by sending the operations and the data to one or more other packet processors.

10. The method of claim 1, wherein the operations and the data are sent as an atomic unit which either succeeds or fails atomically.

11. A system comprising:
one or more data processing units;
a data store; and
a computer-readable medium having encoded thereon computer-executable instructions to cause the one or more data processing units to perform operations comprising:

receiving, from a control node of a communications network, a request to program operations for processing data packets being communicated between two endpoints of the communications network, the request received with data comprising a state of the control node and the processed data packets, the control node configured to operate in a control plane of the communications network and manage communication of the data packets in the communications network;

storing the operations and the data in the data store;

receiving, from the control node, a subsequent request to retrieve the data; and sending, to the control node, the operations and the data that were stored in the data store.

12. The system of claim 11, wherein the program operations are represented as a packet processing subgraph.

13. The system of claim 12, wherein the data comprises a graph object of the packet processing subgraph.

14. The system of claim 11, wherein the data includes a byte array of application data.

15. The system of claim 14, wherein the data further includes a version identifier that indicates a format of the byte array of application data.

16. A computer-readable storage device having encoded thereon computer-executable instructions that, when executed, cause one or more processing units of a computing device to execute operations comprising:

sending, to a packet processor of a communications network, a request to program operations for processing data packets, the request including data comprising a control plane state, wherein the packet processor is configured to store the operations and the data in a data store of the packet processor;

sending, to the packet processor, a subsequent request to retrieve the data; and receiving, from the packet processor, the operations and the data that were stored in the data store of the packet processor;

wherein the control plane state is not stored locally.

17. The computer-readable storage device of claim 16, wherein the data is requested in response to a user event in the communications network.

18. The computer-readable storage device of claim 16, wherein the data is requested in response to a failure in the communications network.

19. The computer-readable storage device of claim 16, wherein the program operations are represented as a packet processing subgraph.

20. The computer-readable storage device of claim 19, wherein the data comprises a graph object of the packet processing subgraph.

\* \* \* \* \*